United States Patent
Lefebvre et al.

(10) Patent No.: US 6,700,580 B2
(45) Date of Patent: Mar. 2, 2004

(54) SYSTEM AND METHOD UTILIZING MULTIPLE PIPELINES TO RENDER GRAPHICAL DATA

(75) Inventors: Kevin T. Lefebvre, Fort Collins, CO (US); Jeffrey J. Walls, Fort Collins, CO (US); Jim Schinnerer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 208 days.

(21) Appl. No.: 10/087,429

(22) Filed: Mar. 1, 2002

(65) Prior Publication Data

US 2003/0164834 A1 Sep. 4, 2003

(51) Int. Cl.$^7$ ................................. G06T 1/20
(52) U.S. Cl. .................. 345/506; 345/504; 345/536; 345/419
(58) Field of Search ................. 345/501–506, 345/522, 536, 563, 419, 589, 591, 593, 418, 545

(56) References Cited

U.S. PATENT DOCUMENTS

| | | | | |
|---|---|---|---|---|
| 5,283,860 A | | 2/1994 | Einkauf et al. ............. 395/134 |
| 5,321,808 A | | 6/1994 | Rupp ......................... 395/164 |
| 5,392,394 A | * | 2/1995 | Hamana ..................... 345/504 |
| 5,408,606 A | * | 4/1995 | Eckart ........................ 345/505 |
| 5,757,321 A | | 5/1998 | Billyard ..................... 345/434 |
| 5,844,553 A | | 12/1998 | Hao et al. .................. 345/329 |
| 5,847,711 A | * | 12/1998 | Kaufman et al. ........... 345/424 |
| 5,963,200 A | * | 10/1999 | Deering et al. ............. 345/504 |
| 6,005,572 A | | 12/1999 | Kurihara ..................... 345/340 |
| 6,046,709 A | * | 4/2000 | Shelton et al. ............. 345/504 |
| 6,075,917 A | | 6/2000 | Kim ........................... 386/47 |
| 6,088,036 A | | 7/2000 | Morris ........................ 345/428 |
| 6,157,395 A | * | 12/2000 | Alcorn ........................ 345/506 |
| 6,188,385 B1 | | 2/2001 | Hill et al. ................... 345/136 |
| 6,215,486 B1 | | 4/2001 | Walls et al. ................. 345/329 |
| 6,222,550 B1 | | 4/2001 | Rosman et al. ............. 345/419 |
| 6,249,294 B1 | | 6/2001 | Lefebvre et al. ............ 345/504 |
| 6,343,309 B1 | * | 1/2002 | Clarke et al. ............... 345/418 |
| 6,515,670 B1 | * | 2/2003 | Huang et al. ............... 345/503 |
| 2002/0085010 A1 | * | 7/2002 | McCormack et al. ....... 345/545 |

OTHER PUBLICATIONS

Computer Graphics, "PixelFlow: High Speed Rendering Using Image Composition" by Molnar et al, SIGGRAPH'92, Jul. 26–31, 1992, pp. 231–240.*

(List continued on next page.)

Primary Examiner—Kee M. Tung

(57) ABSTRACT

A system for rendering graphical data utilizes a plurality of frame buffers, a plurality of graphics pipelines, a compositor, and logic. The plurality of graphics pipelines are configured to receive graphics commands and to render graphical data to each of the plurality of frame buffers based on the received graphics commands. The compositor is configured to receive a control signal and to interface the graphical data with a display device based on the control signal. The logic is configured to analyze the graphics commands and to make a determination, based on the graphics commands, as to which pixels defined by the graphical data are associated with three-dimensional (3D) regions. The logic is further configured to transmit the control signal to the compositor, wherein the control signal is based on the determination.

22 Claims, 12 Drawing Sheets

OTHER PUBLICATIONS

1997 SIGGRAPH/Eurographics Workshop, "PixelFlow: The Realization", Eyles et al, Aug. 3–4, 1997, pp. 57–68.*

Microprocessor Report, "Talisman redefines 3D rendering; new Microsoft architecture trades precision for speed", Peter Glaskowsky, v10, n11, p8(3)., Aug. 26, 1996.*

"Understanding X Features: Distributed Single Logical Screen" http://www.hp.com/xwindow/sharedInfo/Whitepapers/Slsd/slsd.html, 1998, pp. 1–10.

Lefebvre, Kevin "Hewlett–Packard's Large Screen Multi–Display Technology: An Exploration of the Architecture Behind HP's New Immersive Visualization Solutions" http://wwww.hp.com;xwindow/sharedInfo/Whitepapers/Sls3d/sls_3d.html; 1998, pp. 1–9.

"Understanding X Features: Multiple Dispay Technologies" http://www.hp.com/xwindow/sharedInfo/Whitepapers/Sls/sls.html, 1997, pp. 1–13.

* cited by examiner

SYSTEM AND METHOD UTILIZING MULTIPLE PIPELINES TO RENDER GRAPHICAL DATA

BACKGROUND OF THE INVENTION

1. Field of the Invention

The present invention generally relates to graphical display systems and, in particular, to a system and method utilizing multiple pipelines to render graphical data.

2. Related Art

Computer graphical display systems are commonly used for displaying graphical representations of two-dimensional and/or three-dimensional objects on a two-dimensional display device, such as a cathode ray tube, for example. In this regard, a computer graphical display system normally comprises one or more graphics applications having graphical data that defines one or more graphical objects. When a graphical object is to be displayed, the graphics application submits a command or a set of commands, referred to hereafter as a "drawing command," for drawing the object. The drawing command includes or is associated with graphical data that defines the color value and possibly other attributes for each pixel of the object.

In response to the drawing command, a graphics pipeline within the graphical display system renders the command's graphical data to a frame buffer. The data within the frame buffer defines the display attributes (e.g., color) for each pixel of a display device, which periodically reads the frame buffer and colors each pixel displayed by the display device according to each pixel's corresponding color value in the frame buffer. Moreover, by rendering the graphical data of the drawing command to the frame buffer, the image displayed by the output device is eventually updated to comprise an image of the object defined by the graphical data of the drawing command.

Higher quality images are often defined by larger amounts of graphical data. However, increasing the amount of graphical data defining an image to be displayed by a typical graphical display system generally increases the amount time required for the graphical display system to render the graphical data. Thus, a trade-off between image quality and rendering speed often exists, and the overall rendering speed of a typical graphical display system is often a limiting factor in the types of images rendered by the graphical display system.

SUMMARY OF THE INVENTION

Generally, the present invention provides a system and method utilizing multiple pipelines for rendering graphical data.

A system in accordance with an exemplary embodiment of the present invention utilizes a plurality of frame buffers, a plurality of graphics pipelines, a compositor, and logic. The plurality of graphics pipelines is configured to receive graphics commands and to render graphical data to each of the plurality of frame buffers based on the received graphics commands. The compositor is configured to receive a control signal and to interface the graphical data with a display device based on the control signal. The logic is configured to analyze the graphics commands and to make a determination, based on the graphics commands, as to which pixels defined by the graphical data are associated with three-dimensional (3D) regions. The logic is further configured to transmit the control signal to the compositor, wherein the control signal is based on the determination.

A method in accordance with an exemplary embodiment of the present invention can be broadly conceptualized by the following steps: rendering graphical data, in parallel, to a plurality of frame buffers, the graphical data defining a plurality of pixels; transmitting the rendered graphical data via a plurality of video data streams; determining which of the pixels are associated with three-dimensional (3D) regions; transmitting, in parallel with the video data streams, a signal having information indicative of the pixels determined to be associated with 3D regions; and forming, based on the information, a composite data signal that is derived from the rendered graphical data.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
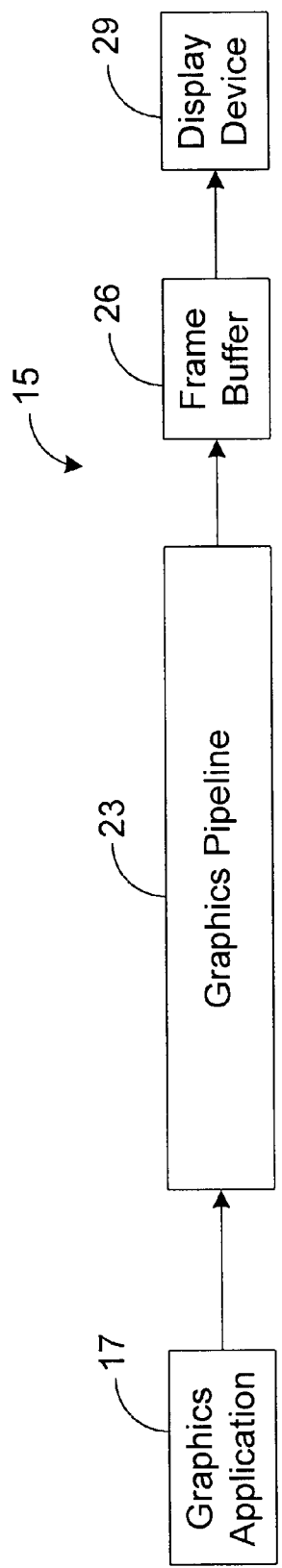
FIG. 1 is a block diagram illustrating a conventional graphical display system.

FIG. 1 depicts an exemplary embodiment of a conventional computer graphical display system 15. A graphics application 17 defines, in data, various objects that may be rendered and displayed by the system 15. To display an object, the application 17 transmits a graphics command having graphical data that defines the object to a graphics pipeline 23, which may be implemented in hardware, software, or a combination thereof. The graphics pipeline 23 receives the graphical data from the application 17 and, through well-known techniques, renders the graphical data to a frame buffer 26.

In general, the frame buffer 26 stores graphical data defining an image that is to be displayed by a display device 29. In this regard, the frame buffer 26 comprises a set of data for each pixel displayed by the display device 29. Each set of data is correlated with the coordinate values that identify one of the pixels displayed by the display device 29, and each set of data comprises the color value of the identified pixel, as well as any additional information needed to appropriately color or shade the identified pixel.

Figure 2:
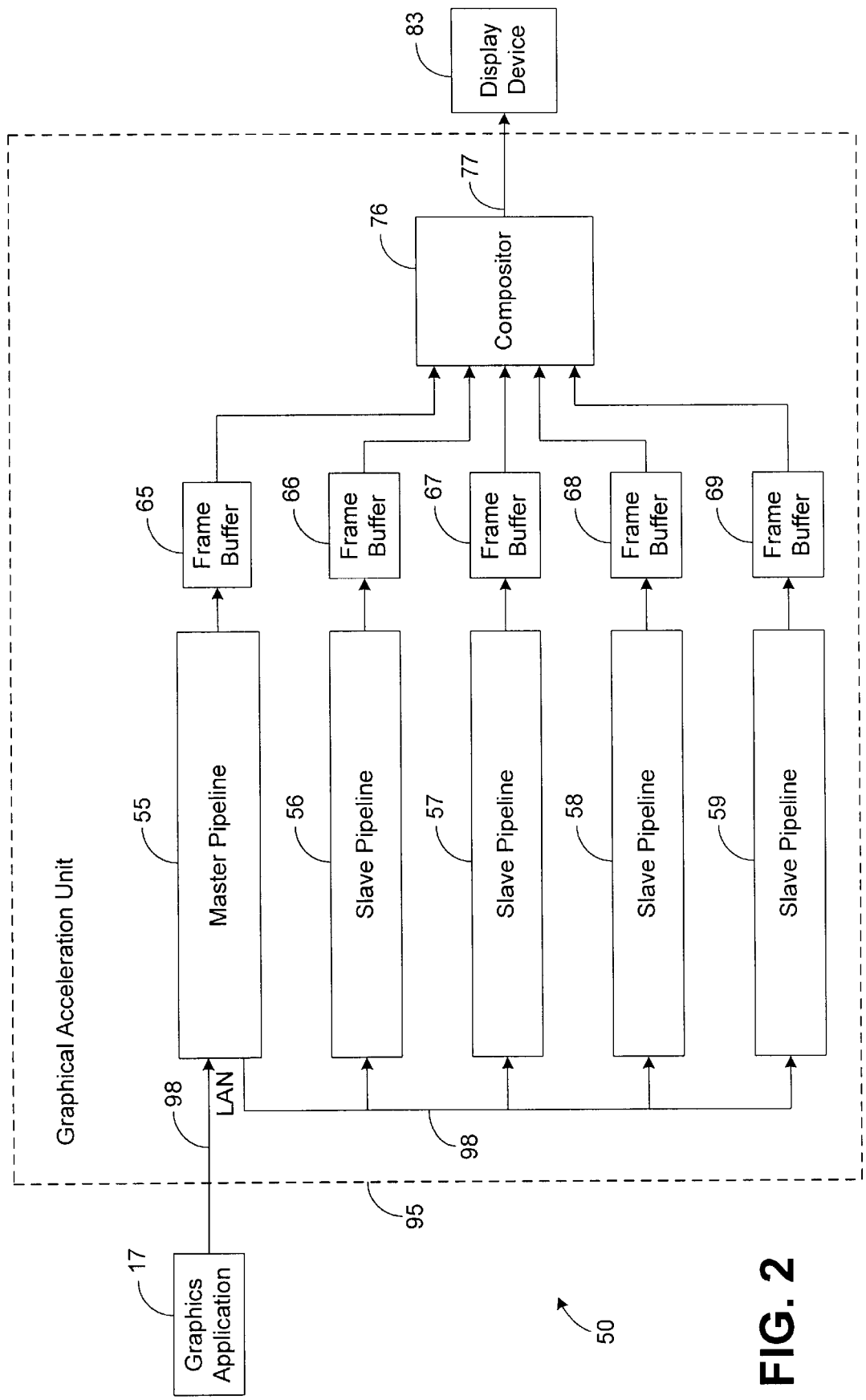
FIG. 2 is a block diagram illustrating a graphical display system in accordance with an exemplary embodiment of the present invention.

By employing a plurality of graphics pipelines, it is possible to increase rendering speed and/or image quality. For example, FIG. 2 depicts an exemplary embodiment of a computer graphical display system 50 having multiple pipelines 55–59. As shown by FIG. 2, the system 50 comprises a graphics application 17, a master graphics pipeline 55, and one or more slave graphics pipelines 56–59. The pipelines 55–59 may be implemented via hardware, software or any combination thereof. It should be noted that the embodiment shown by FIG. 2 depicts four slave pipelines 56–59 for illustrative purposes only, and any number of slave pipelines 56–59 may be employed to implement the system 50 in other embodiments.

The master pipeline 55 receives graphics commands from the application 17. The master pipeline 55 preferably renders the graphical data from two-dimensional (2D) graphics commands to the frame buffer 65 and passes three-dimensional (3D) graphics commands to the slave pipelines 56–59, which render the graphical data of the 3D graphics commands to the frame buffers 66–69, respectively. As used herein, a "2D graphics command" refers to a graphics command that comprises 2D graphical data but no 3D graphical data, and a "3D graphics command" refers to a graphics command that comprises 3D graphical data. Note that a 3D graphics command may also comprise 2D graphical data.

Also note that other arrangements of the pipelines 55–59 are possible in other embodiments. More specifically, the master pipeline 55 may be configured to render graphical data from 3D graphics commands in addition to or in lieu of graphical data from 2D graphics commands, and one or more of the slave pipelines 56–59 may be configured to render graphical data from 2D graphics commands instead of or in addition to graphical data from 3D graphics commands.

Each frame buffer 65–69 outputs a stream of graphical data to a compositor 76, which may be implemented in software, hardware, or a combination thereof. The compositor 76 is configured to provide, to a display device 83 (e.g., a cathode ray tube), a composite data signal 77 based on each of the video data streams from the frame buffers 65–69. The graphical data provided to the display device 83 by the compositor 76 defines an image to be displayed by the display device 83 and is based on the graphical data rendered by the pipelines 55–59 to the frame buffers 65–69. The compositor 76 will be further described in more detail hereafter. Note that the pipelines 55–59, the frame buffers 65–69, and the compositor 76 will be collectively referred to herein as a graphical acceleration unit 95.

In some situations, it may be desirable to distribute some of the graphics pipelines 55–59 across multiple computers.

In this regard, by distributing the graphics pipelines 55–59 across multiple computers, it is possible to divide the processing burden associated with the rendering performed by the pipelines 55–59 across the multiple computers rather than having a single computer bear the entire processing burden alone. For illustrative purposes, assume that, in the embodiment shown by FIG. 2, each of the graphics pipelines 55–59 is implemented via a different computer. However, it should be noted that, in other embodiments, multiple ones of the graphics pipelines 55–59 could be implemented via the same computer, if desired.

When the graphics pipelines 55–59 are implemented via different computers, it may be desirable to utilize a network, such as a local area network (LAN), for example, to enable communication between the pipelines 55–59. Indeed, in the exemplary embodiment shown by FIG. 2, a LAN 98 is utilized to interconnect each of the pipelines 55–59, which preferably reside on different computers as described above.

Figure 3:
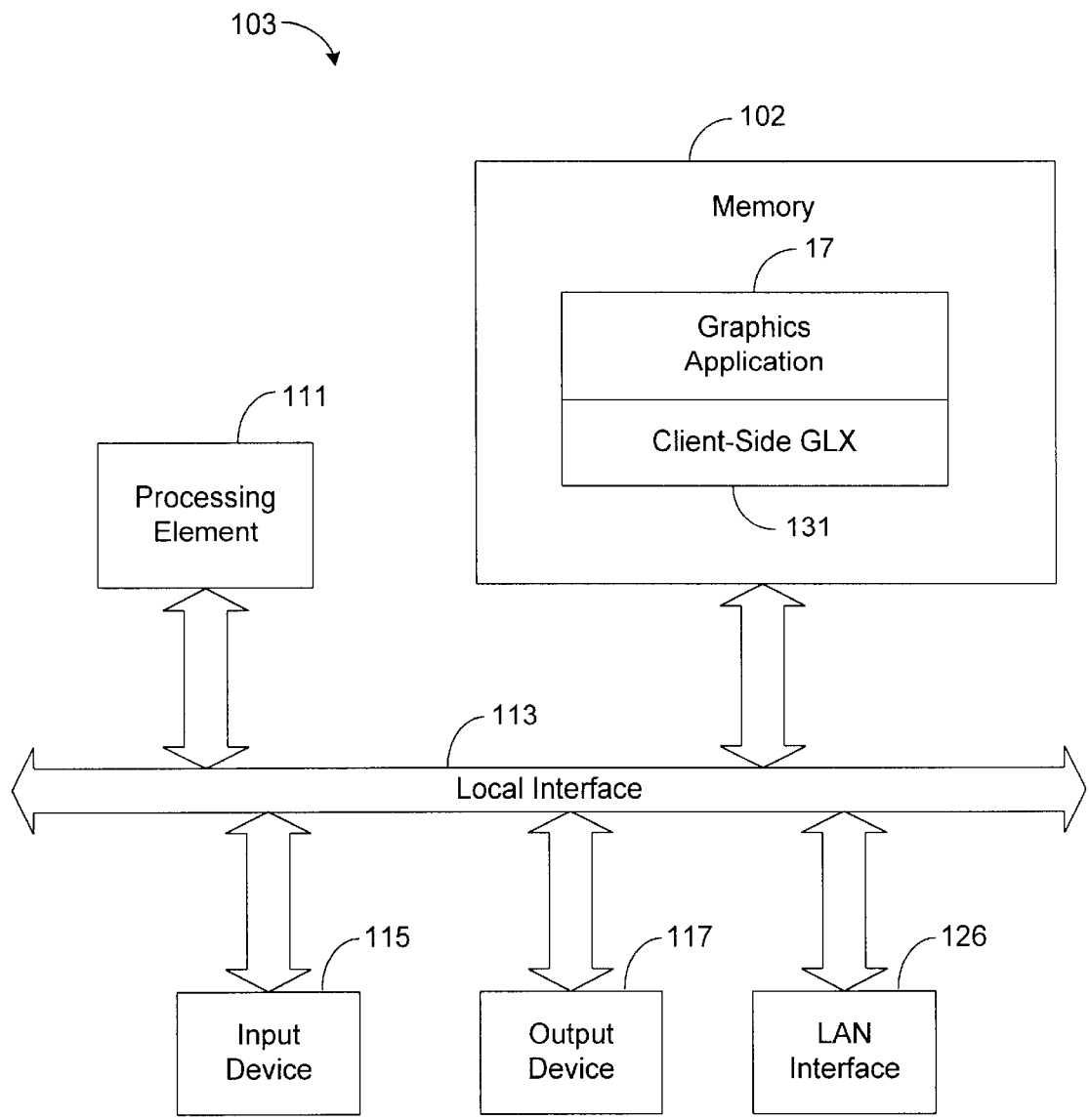
FIG. 3 is a block diagram illustrating a computer that may be utilized to implement a graphics application such as is depicted in FIG. 2.

FIG. 3 depicts a block diagram of a computer 103, referred to hereafter as "client computer," that may be utilized to run the graphics application 17 in the preferred embodiment. As can be seen by referring to FIG. 3, the client computer 103 preferably stores the graphics application 17 in memory 102. Through conventional techniques, the application 17 is executed via one or more conventional processing elements 111, such as a central processing unit (CPU), for example, which communicates to and drives the other elements within the client computer 103 via a local interface 113, which can comprise one or more buses. Furthermore, an input device 115, for example, a keyboard or a mouse, can be used to input data from a user of the client computer 103, and an output device 117, for example, a display device or a printer, can be used to output data to the user. The client computer 103 preferably comprises a LAN interface 126 that allows the client computer 103 to exchange data with the LAN 98.

Various types of network protocols may be employed to process the graphical data received from the graphics application 17. In the exemplary embodiment of the system 50 described herein, X Protocol is preferably utilized to render 2D graphical data, and an extension of X Protocol, referred to as "OpenGL (OGL) Protocol," is preferably utilized to render 3D graphical data, although other types of protocols may be utilized in other embodiments.

By way of background, OGL Protocol is a standard application programming interface (API) to hardware that accelerates 3D graphics operations. Although OGL Protocol is designed to be window system independent, it is often used with window systems, such as the X Window System, for example. In order that OGL Protocol may be used in an X Window System environment, an extension of the X Window System has been developed called "GLX." For more complete information on the GLX extension to the X Window System and on how OGL Protocol can be integrated with the X Window System, see for example Mark J. Kilgard, OpenGL Programming for the X Window System (Addison-Wesley Developers Press 1996), which is incorporated herein by reference. Also see commonly-assigned U.S. Pat. No. 6,249,294, entitled "3D Graphics in a Single Logical Screen Display Using Multiple Remote Computer Systems," which is incorporated herein by reference as well.

The client computer 103 preferably comprises a client-side GLX layer 131 that can be implemented in software, hardware, or a combination thereof. In the embodiment shown by FIG. 3, the client-side GLX layer 131 is implemented in software and translates each graphics command issued by the graphics application 17 into one or more X Protocol commands for performing the functionality commanded by the issued command. In the preferred embodiment, the X Protocol commands are communicated to master pipeline 55 via LAN interface 126 and LAN 98.

Figure 4:
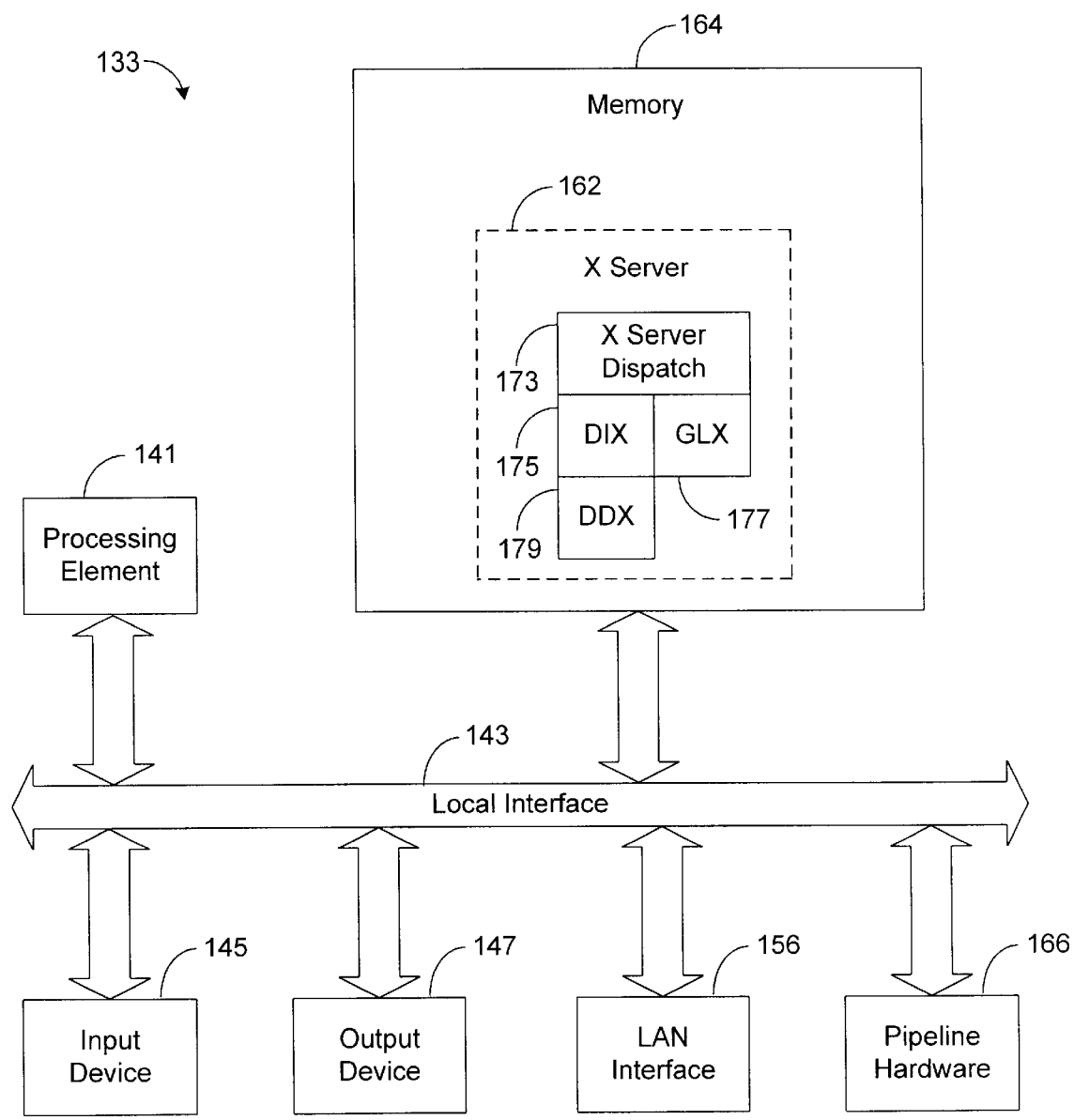
FIG. 4 is a block diagram illustrating a computer that may be utilized to implement a master graphics pipeline such as is depicted in FIG. 2.

FIG. 4 depicts a block diagram of a computer 133 that may be utilized to implement the master pipeline 55 in the preferred embodiment. As shown by FIG. 4, the computer 133 preferably comprises one or more processing elements 141, such as a central processing unit, for example, that communicate to and drive the other elements within the computer 133 via a local interface 143, which can comprise one or more buses. Furthermore, an input device 145, for example, a keyboard or a mouse, can be used to input data from a user of the computer 133, and an output device 147, for example, a display device or a printer, can be used to output data to the user. The computer 133 may be connected to a LAN interface 156 that allows the computer 133 to exchange data with the LAN 98.

The computer 133 of the preferred embodiment also comprises an X server 162. The X server 162 may be implemented in software, hardware, or a combination thereof, and in the embodiment shown by FIG. 4, the X server 162 is implemented in software and stored in memory 164. In the preferred embodiment, the X server 162 renders 2D X Protocol commands, such as commands to create or move an X window. In this regard, an X server dispatch layer 173 is designed to route received commands to a device independent (DIX) layer 175 or to a GLX layer 177. A 2D X Protocol command (i.e., an X Protocol command that does not comprise 3D graphical data) is interfaced with the DIX layer 175, whereas a 3D X Protocol command (i.e., an X Protocol command that comprises 3D graphical data, such as an X Protocol command having embedded OGL Protocol) is routed to the GLX layer 177. An example of a 3D X Protocol command is an X Protocol command that creates or changes the state of a 3D image within a 2D X window.

Moreover, a command interfaced with the DIX layer 175 is executed by the DIX layer 175 and by a device dependent (DDX) layer 179, which drives graphical data associated with the executed command through pipeline hardware 166 to the frame buffer 65. A command interfaced with the GLX layer 177 is transmitted by the GLX layer 177 across the LAN 98 to the slave pipelines 56–59. After receiving the command, one or more of the pipelines 56–59 execute the command and render the graphical data associated with the command to one or more frame buffers 66–69. Note that logic for implementing the master pipeline 55 shown by FIG. 2 generally resides within the X server 162 and the pipeline hardware 166 of FIG. 4.

Although the graphics application 17 and the master pipeline 55 are implemented via different computers 103 and 133 in the preferred embodiment, it is possible for the graphics application 17 and the master pipeline 55 to be implemented via the same computer in other embodiments. For example, it is possible to store the graphics application 17 and the client-side GLX layer 131 in the memory 164 of the computer 133 shown by FIG. 4.

Figure 5:
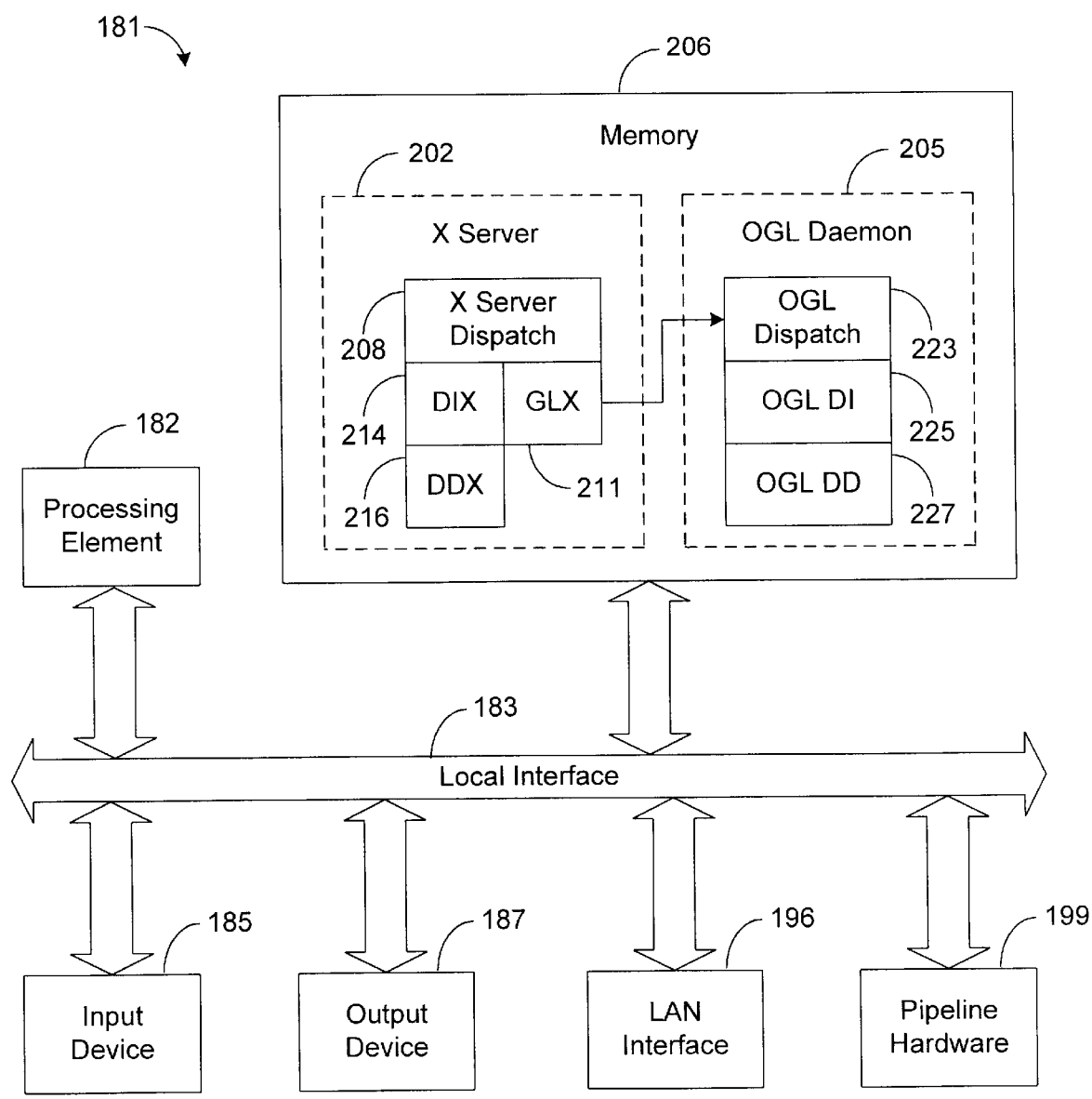
FIG. 5 is a block diagram illustrating a computer that may be utilized to implement a slave graphics pipeline such as is depicted in FIG. 2.

FIG. 5 depicts a block diagram of a computer 181 that may be utilized to implement any one of the slave pipelines 56–59. The computer 181, shown by FIG. 5, preferably comprises an X server 202, similar to the X server 162 previously described for computer 133, and an OGL daemon 205. The X server 202 and OGL daemon 205 may be implemented in software, hardware, or a combination thereof, and in the embodiment shown by FIG. 5, the X server 202 and OGL daemon 205 are implemented in software and stored in memory 206.

Similar to computers 103 and 133 (FIGS. 3 and 4), the computer 181 of FIG. 5 comprises one or more processing elements 182 that communicate to and drive the other elements within the computer 181 via a local interface 183, which can comprise one or more buses. Furthermore, an input device 185, for example, a keyboard or a mouse, can be used to input data from a user of the computer 181, and an output device 187, for example, a display device or a printer, can be used to output data to the user. The computer 181 preferably comprises a LAN interface 196 that allows the computer 181 to exchange data with the LAN 98.

Similar to X server 162 (FIG. 4), the X server 202 of FIG. 5 comprises an X server dispatch layer 208, a GLX layer 211, a DIX layer 214, and a DDX layer 216. In the preferred embodiment, each command received by the computer 181 comprises 3D graphical data, because the X server 162 of master pipeline 55 preferably executes each 2D X Protocol command. The X server dispatch layer 208 interfaces the 2D data of any received commands with DIX layer 214 and interfaces the 3D data of any received commands with the GLX layer 211. The DIX and DDX layers 214 and 216 are configured to process or accelerate the 2D data and to drive the 2D data through pipeline hardware 199 to one of the frame buffers 66–69 (FIG. 2).

The GLX layer 211 interfaces the 3D data with the OGL dispatch layer 223 of the OGL daemon 205. The OGL dispatch layer 223 interfaces this data with the OGL DI layer 225. The OGL DI layer 225 and DD layer 227 are configured to process the 3D data and to accelerate or drive the 3D data through pipeline hardware 199 to one of the frame buffers 66–69 (FIG. 3). Thus, the 2D graphical data of a received command is processed or accelerated by the X server 202, and the 3D graphical data of the received command is processed or accelerated by the OGL daemon 205. Note that logic for implementing a slave pipeline 56–59 (FIG. 2) generally resides within the X server 202, pipeline hardware 199, and OGL Daemon 205.

As set forth above, the compositor 76 (FIG. 2) is configured to form a composite data signal 77 that is based on the graphical data stored in the frame buffers 65–69. The composite data signal 77 defines the color values for the pixels of the display device 83, and the display device 83 updates its displayed image based on the color values received from the composite data signal 77. Exemplary techniques that may be utilized by the compositor 76 to process the graphical data from the frame buffers 65–69 and to form the composite data signal 77 will now be generally described in more detail hereafter.

In this regard, the compositor 76 preferably processes the graphical data from the frame buffers 65–69 differently depending on the type of rendering that is desired. For example, in some situations, it may be desirable to utilize the additional processing power provided by the slave pipelines 56–59 in an effort to increase the overall rendering speed of the system 50. In such situations, each of the slave pipelines 56–59 may be configured to only render a different portion of a 3D image to be displayed by the display device 83. In essence, each slave pipeline 56–59 is responsible for only rendering graphical data that defines a particular area of the 3D image and discards any graphical data that defines an area outside of the pipeline's particular area of responsibility.

The compositor 76 then inserts, into the composite data signal 77, color values from each of the frame buffers 65–69 depending on the areas of responsibility for the pipelines 55–59. In this regard, the compositor 76 inserts, into the composite data signal 77, a color value from a particular frame buffer 65–69 only if the color value is within the area of responsibility for the particular buffer's corresponding pipeline 55–59. In this example, each pipeline 55–59 renders, to its respective frame buffer 65–69 only a portion of the overall graphical data defining the image displayed by the display device 83, potentially increasing the overall rendering speed of the system 50. When rendering graphical data according to the foregoing techniques, the system 50 shall be referred to as operating in the "optimization mode."

In other situations, it may be desirable to utilize the additional processing power provided by the slave pipelines 56–69 in an effort to increase image quality. There are several ways that this may be accomplished. For example, each of the slave pipelines 56–59 may be configured to render only a portion of a 3D image to be displayed by the display device 83, as described above. However, before rendering to the frame buffers 66–69, the slave pipelines 56–69 super-sample the graphical data rendered by the slave pipelines 56–59. In other words, each of the slave pipelines 56–59 magnifies the image being rendered by the pipeline 56–59. For each of the frame buffers 66–69, the compositor 76 blends the graphical data within the frame buffers 66–69 such that the image defined by such data is reduced to its original size (i.e., the image's size before super-sampling).

The compositor 76 then inserts, into the composite data signal 77, the blended color values depending on the areas of responsibility for the pipelines 55–59. In this regard, the compositor 76 inserts, into the composite data signal 77, the blended color values derived from each of the frame buffers 66–69 just as the compositor 76 inserted the graphical data from each of the frame buffers 66–69 in the example previously described above. By super-sampling and then blending the graphical data rendered by each of the slave pipelines 56–69, the image displayed by the display device 83 is anti-aliased. When rendering graphical data according to the foregoing techniques, the system 50 shall be referred to as operating in the "super-sampling mode."

In another example, the quality of the 3D images displayed by the display device 83 may be increased via jitter enhancement. In this regard, each of the slaves pipelines 56–59 renders, to the frame buffers 66–69, the entire 3D image to be displayed by the display device 83. However, in rendering the graphical data, each of the slave pipelines 56–59 adds a small offset to the coordinates of each pixel rendered by the pipeline 56–59. The offset applied to the pixel coordinates is preferably different for each different pipeline 56–59.

The compositor 76 averages the color values for the same pixel coordinates from frame buffers 66–69 to define the pixel color values that are provided to the display device 83 via the composite signal 281. The display device 83 then displays the averaged color values, thereby displaying a jitter enhanced 3D image. When rendering graphical data according to the foregoing techniques, the system 50 shall be referred to as operating in the "jitter enhancement mode."

Note that the aforedescribed techniques for utilizing the additional slave pipelines 56–59 in an effort to enhance rendering speed and/or image quality are described in more detail in commonly-assigned U.S. patent application Ser. No. 09/715,335, entitled "System and Method for Efficiently Rendering Graphical Data," which is incorporated herein by reference. In addition, other techniques may be employed to exploit the additional processing power provided by the slave pipelines 56–69 for the purposes of enhancing rendering speed and/or image quality.

It should be noted that in U.S. patent application Ser. No. 09/715,335, the compositor 76 utilizes a "chroma key" in compositing the data from the frame buffers 65–69. In this regard, as described above, the master pipeline 55 preferably renders 2D graphics commands (e.g., a command for displaying a 2D X window), and 3D commands (e.g., commands for displaying 3D objects) are passed to the slave pipelines 56–69. In rendering a 2D object (e.g., a 2D X window) from a 2D graphics command, the master pipeline 55 preferably determines which portions of the 2D object are to be utilized for displaying 3D objects defined by 3D graphics commands passed to the slave pipelines 56–59. Each pixel within such a portion is then assigned particular color value, referred to as a "chroma key." Moreover, a color value not likely to be utilized in drawing typical 2D and/or 3D objects is preferably selected as the chroma key.

Figure 6:
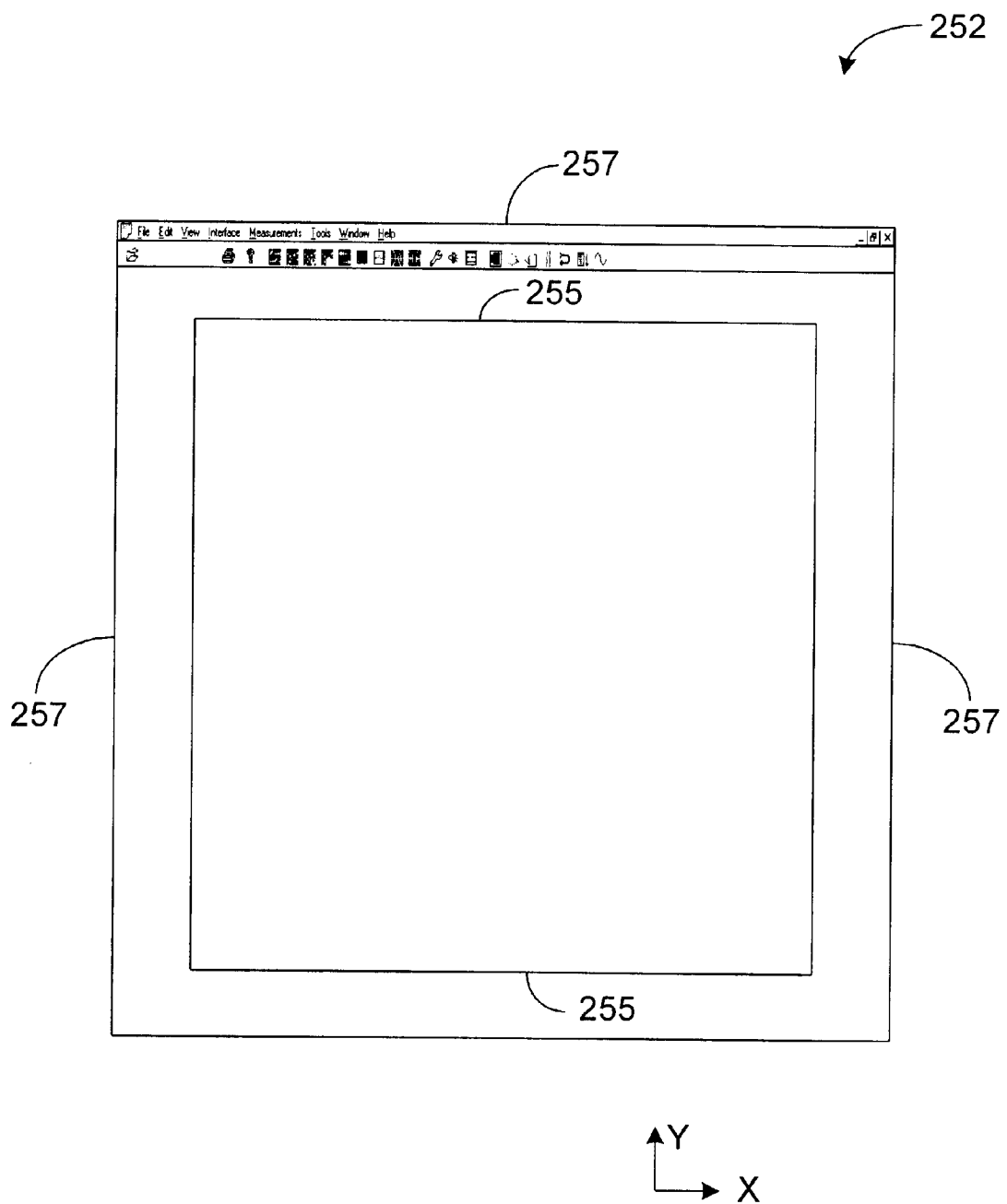
FIG. 6 is a diagram illustrating an exemplary two-dimensional window that may be displayed by the graphical display system such as is depicted in FIG. 2.

As an example, refer to FIG. 6, which depicts an exemplary 2D X window 252 that may be defined by the graphical data stored within frame buffer 65. Assume that the inner portion 255 within the borders 257, which may comprise various icons and/or menu options, is to be utilized to display 3D objects defined by the 3D graphics commands passed to the slave pipelines 56–59. In rendering a 2D graphics command for displaying the window 252, the X server 162 (FIG. 4) of the master pipeline 55 assigns color values to the pixels associated with the border 257 based on the graphical data being rendered by the X server 162. This graphical data defines the borders 257, as shown by FIG. 6. However, the X server 162 assigns the predetermined color value of the chroma key to the pixels associated with the 3D portion 255. Therefore, if the data within the frame buffer 65 were directly passed to the display device 83 without being composited with data from other frame buffers 66–69, then the inner portion 255 would appear as a solid color corresponding to the color value of the chroma key.

However, in the preferred embodiment, the data from the frame buffer 65 is passed through the compositor 76 before being displayed by the display device 83. The compositor 76 generally passes each non-chroma key color value from the frame buffer 65 to the display device 83. However, when the compositor 76 detects a chroma key color value from the frame buffer 65, the compositor 76 replaces the chroma key color value with a value derived from one or more of the color values received from frame buffers 66–69, depending on the mode of operation (e.g., depending on whether the system 50 is utilizing the data from frame buffers 66–69 to perform anti-aliasing, jitter enhancement, etc.). Moreover, the presence of chroma key values within the data being received by the compositor 76 informs the compositor 76 when it should insert into the composite signal a color value based on the graphical data from the other frame buffers 66–69.

Unfortunately, most conventional X servers, in rendering a 2D object, are not designed to assign the chroma key to the portions of the 2D object where a 3D object of another graphics command may be drawn. Thus, modification of a conventional X server may be required before it can be utilized to implement the master pipeline 55 shown in FIG. 2. More specifically, a conventional X server may be designed to output a background color value for pixels located within a 2D object portion where 3D rendering may occur. Instead of outputting such a background color value for pixels of the 2D object portion, the conventional X server, to be implemented within the master pipeline 55, is preferably modified to output the chroma key value instead, thereby enabling the compositor 76 to form the composite data signal 77 based on the chroma key, as described above.

To help reduce the complexity of implementing a graphical display system capable of utilizing multiple pipelines to enhance image quality and/or image speed according to the aforedescribed techniques, it may be desirable to design the graphical display system 50 such that modification of conventional X servers is reduced or not necessary. Thus, it may be desirable to employ other techniques in order to inform the compositor 76 when it is to insert a color value derived from a 3D graphics command into the composite data signal 77 provided to the display device 83.

Figure 7:
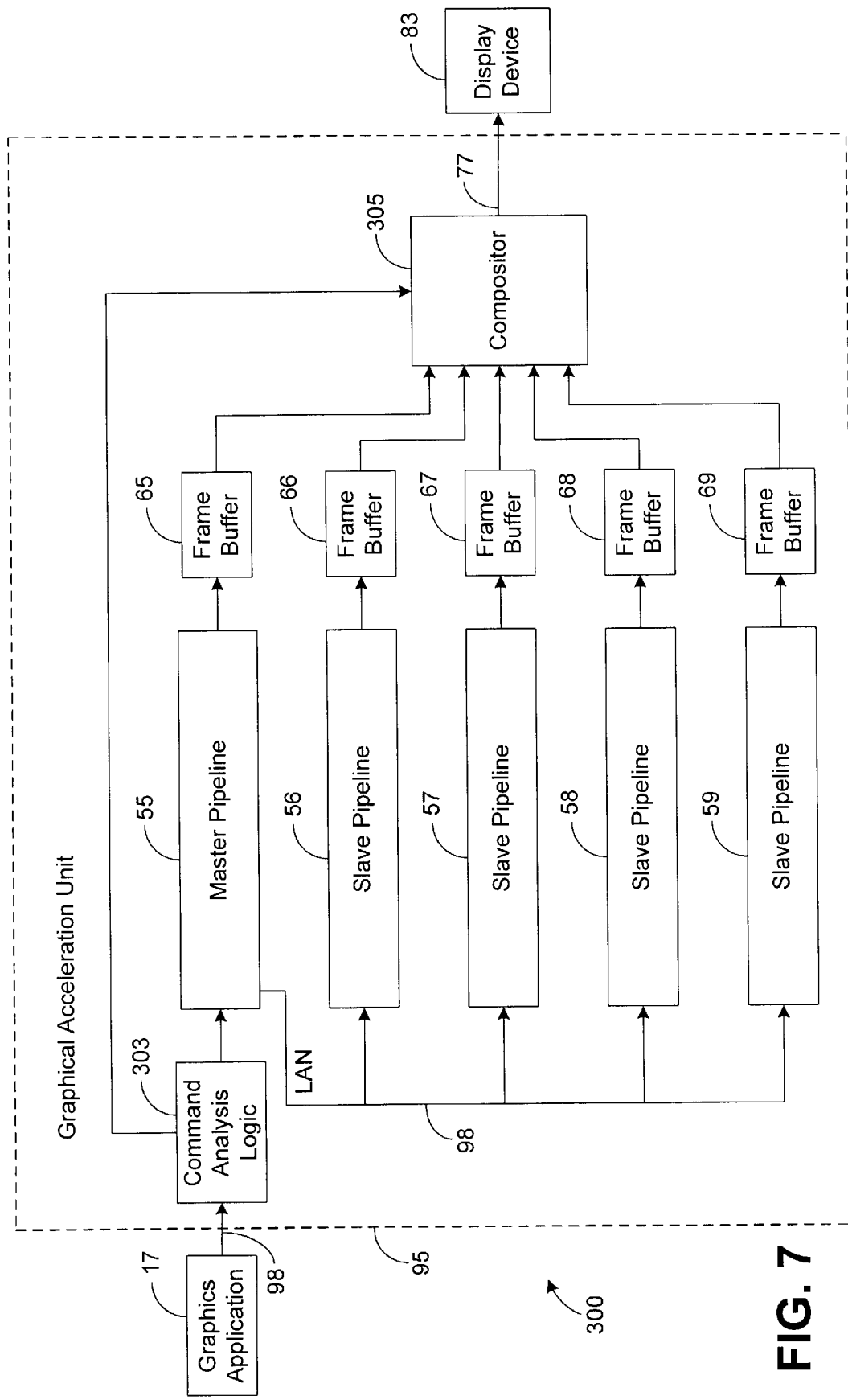
FIG. 7 is a block diagram illustrating a graphical display system in accordance with another embodiment of the present invention.

As an example, FIG. 7 depicts an exemplary graphical display system 300 that employs command analysis logic 303 for informing a compositor 305 of when to insert a color value derived from a 3D graphics command into the composite data signal 77 provided to the display device 83. The command analysis logic 303 may be implemented via software, hardware, or a combination thereof. In the embodiment shown by FIG. 8, the command analysis logic 303 is implemented in software and stored within the memory 164 of the computer 133 utilized to implement the master pipeline 55. However, it should be noted that, in other embodiments, the command analysis logic 303 may reside in other locations, such as the client computer 103, for example.

The command analysis logic 303 is designed to determine which pixels defined by the graphical data received from the graphics application 17 are to be utilized for displaying 3D objects (i.e., objects defined by 3D graphics commands) and to provide this information to the compositor 305. The compositor 305, similar to the compositor 76 of FIG. 2, is configured to provide, to the display device 83, the composite data signal 77 based on the data streams from the frame buffers 65–69. Note that there are a variety of methodologies that may be employed by the command analysis logic 303 to determine which pixels are to be utilized for displaying 3D objects.

For example, in the preferred embodiment of the system 300, the command analysis logic 303 intercepts or otherwise receives the graphics commands transmitted from the application 17 and tracks the objects defined or controlled via these commands. For each command received by the command analysis logic 303, the logic 303 analyzes the command and then passes the command to the X server 162, which then processes the command according to the techniques described above. In analyzing each received command, the command analysis logic 303 determines which pixels of the display device 83 may be utilized for displaying objects of 3D graphics commands and then identifies these pixels to the compositor 305.

As an example, when the command analysis logic 303 receives a 2D graphics command for creating a 2D window, the command analysis logic 303 registers the 2D window. In other words, the command analysis logic 303 stores, in memory 164, data that identifies the 2D window and that indicates various attributes of the 2D window, such as window size, window location within the display of the display device 83, etc. Such data shall be referred to hereafter as "object data 309." Techniques for registering objects in this way are often employed via functions commonly referred to as "window managers."

Some 2D windows have a defined area or region in which 3D objects, defined by one or more 3D graphics commands, may be displayed. Moreover, one of the attributes preferably now included in the object data 309 is information indicative of the location of this region defined for 3D rendering. If the command analysis logic 303 later receives a command that changes the location or size of this region, then the logic 303 preferably updates the object data 309 such that the data 309 correctly indicates which pixels are within the foregoing region. Therefore, based on the object data 309, the command analysis logic 303 can determine which of the window's pixels may be utilized to display 3D objects defined by other graphics commands.

Indeed, in the preferred embodiment, the command analysis logic 303, based on the object data 309, determines which of the pixels of the display device 83 may be utilized to display 3D objects, and identifies these pixels to the compositor 305. As more commands are received by the command analysis logic 303, the set of pixels utilized to render 3D objects changes, and the command analysis logic 303 preferably provides the compositor 305 with appropriate update messages to indicate which pixels may be currently utilized for rendering objects of 3D graphics commands.

Note that there are a variety of methodologies that may be employed for informing the compositor 305 of which pixels may be utilized to display objects of a 3D graphics commands. For example, in one embodiment, the command analysis logic 303, after determining that a particular region may be utilized to display objects of 3D graphics commands, may be configured to transmit to the compositor 305 "extent data" that identifies the region. The extent data may comprise pixel coordinate values and/or vector data identifying the boundary or extent of the particular region. For example, to identify the region 255 of FIG. 6 where objects from 3D graphics commands may be displayed, the command analysis logic 303 may transmit the pixel coordinate values of each corner of the region 255. Alternatively, the command analysis logic 303 may transmit, to the compositor 305, coordinate values for one of the corners along with vector values indicating how many pixels the region 255 extends in the x and y directions from the one corner. The compositor 305 may then utilize the extent data to identify the pixels that may be utilized to display objects of 3D graphics commands.

In another embodiment, the object data 309 may define a bit mask having a bit for each pixel of the display device 83. Initially, the logic 303 may deassert each bit within the bit mask. When the command analysis logic 303 identifies a region (referred to as a "region of 3D rendering") where objects of 3D graphics commands may be displayed, the logic 303 may assert each bit within the bit mask corresponding to one of the pixels within the identified region. If the command analysis logic 303 determines that one of the received commands changes a displayed object such that one or more pixels corresponding to asserted bits in the bit mask are no longer within a region of 3D rendering, then the command analysis logic 303 may deassert the foregoing bits. Thus, the bit mask may be analyzed by the compositor 305 to determine which pixels may be utilized to display objects of 3D graphics commands. Note that the bit mask may be periodically transmitted to the compositor 305 or may be transmitted each time it is updated by the command analysis logic 303.

Figure 8:
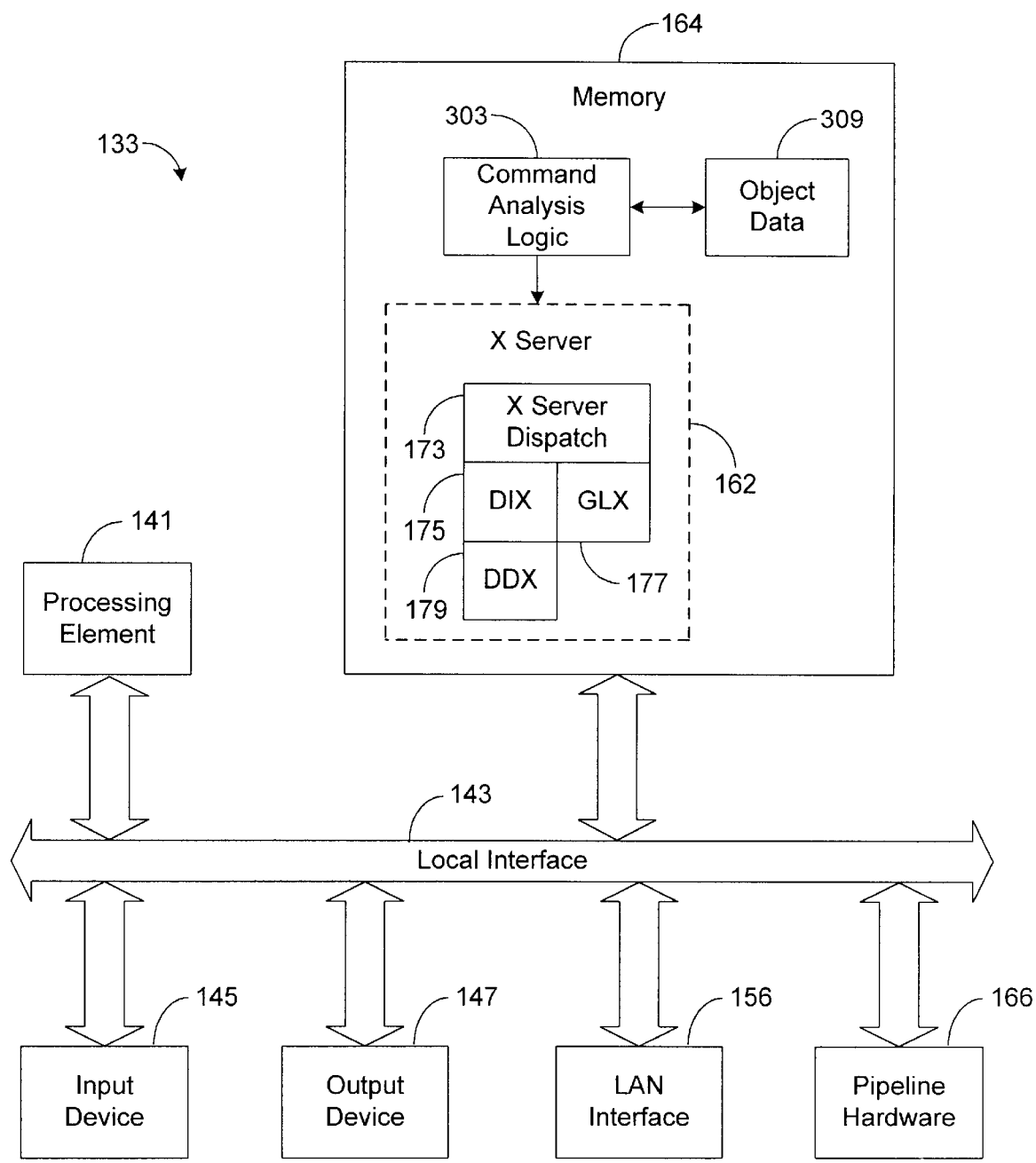
FIG. 8 is a block diagram illustrating a computer that may be utilized to implement a master graphics pipeline and command analysis logic such as is depicted in FIG. 7.

It should be further noted that other techniques for providing the compositor 305 with the information described above may be employed in other embodiments not specifically described herein. For example, the X server 162 (FIG. 4) of the master pipeline 55 may be configured to provide the compositor 305 with data indicative of the regions of 3D rendering via techniques similar to those described above for the command analysis logic 303. In this regard, the X server 162 may be configured to provide the compositor 76 with extent data or a bit mask identifying each pixel to be utilized for displaying objects of 3D graphics commands. However, most conventional X servers are not typically designed to perform such functionality, and modification of a conventional X server may be required if the conventional X server is to be utilized to implement the X server 162 in the aforedescribed embodiment. Thus, it may be desirable to implement command analysis logic 303 separate from the X server 162, as shown by FIG. 8, in order to enable the use of a conventional X server without having to modify the conventional X server.

Figure 9:
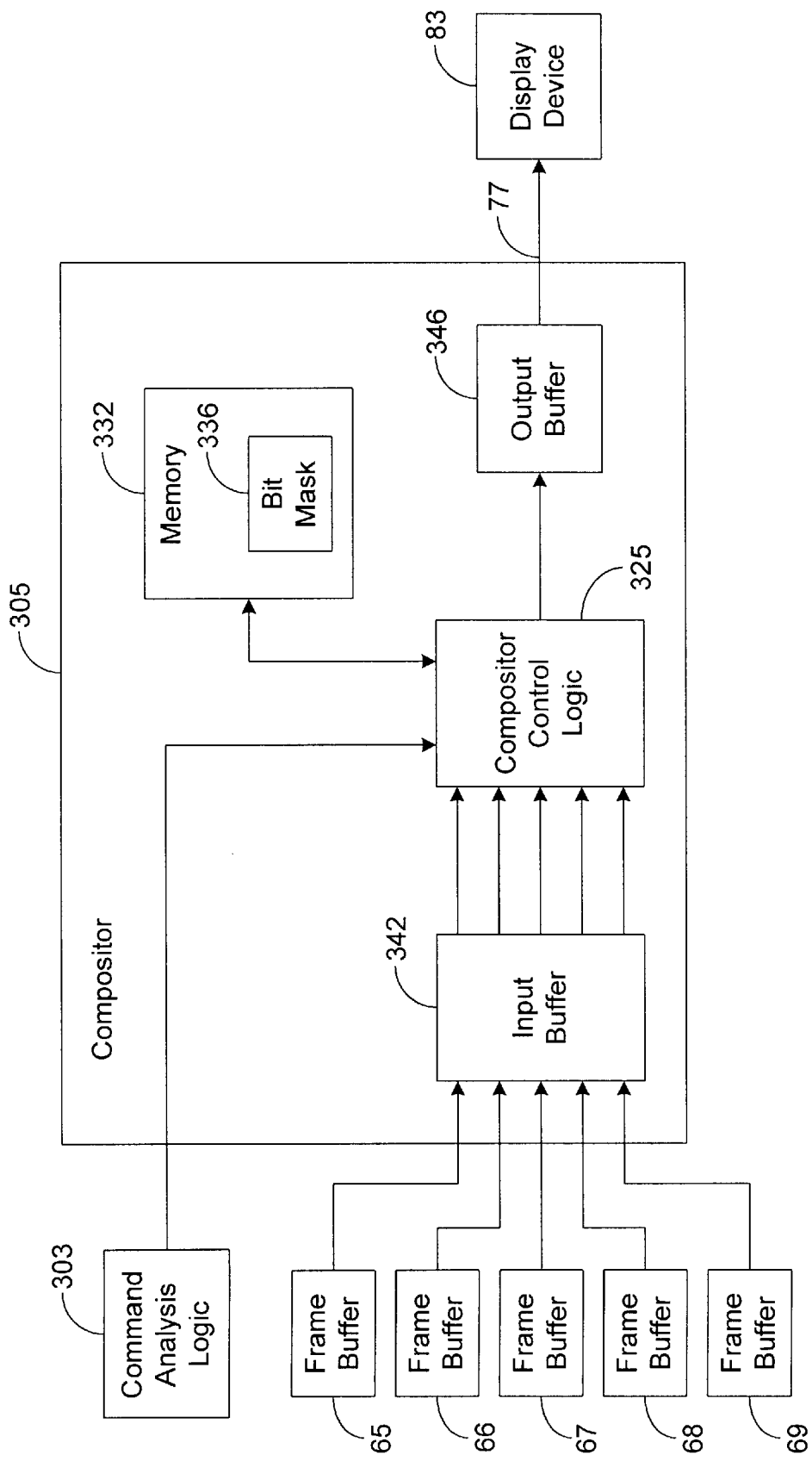
FIG. 9 is a block diagram illustrating a more detailed view of a compositor such as is depicted in FIG. 7.

FIG. 9 depicts a block diagram of the compositor 305 in the preferred embodiment of the system 300. The compositor 305 preferably comprises compositor control logic 325 for controlling the operation of the compositor 305. The compositor control logic 325 may be implemented in software, hardware, or a combination thereof. In the preferred embodiment of system 300, the compositor control logic 325 is implemented in hardware in order to enhance the speed at which the compositor control logic 325 is able to process data from the frame buffers 65–69, as will be described in more detail below.

The compositor control logic 325 preferably receives the data communicated to the compositor 305 from the command analysis logic 303, and based on this data, the compositor control logic 325 stores, in compositor memory 332, information indicative of which pixels are within regions of 3D rendering, as determined by the command analysis logic 303. This stored information is preferably a bit mask 336 similar to the bit mask described above. In this regard, the bit mask 336 preferably has a bit corresponding to a different pixel of the display device 83. For each pixel, the pixel's corresponding bit is asserted if the data from the command analysis logic 303 indicates that the pixel is within a region that may be utilized to render 3D graphics commands, and the pixel's corresponding bit is deasserted if the data from the command analysis logic 303 fails to indicate that the pixel is within such a region.

If the command analysis logic 303 transmits extent data to identify regions of 3D rendering, the compositor control logic 325 preferably processes the extent data to define the bit mask 336. However, if the command analysis logic 303 transmits a bit mask to identify the regions of 3D rendering, then the compositor control logic 325 may simply store the data from the command analysis logic 303 into the memory 332 as the bit mask 336 without further processing this data. It should be emphasized that other techniques may be employed by the compositor control logic 325 to indicate which pixels are within regions of 3D rendering. Indeed, types of data other than the bit mask 336 described above may be employed in other embodiments, if desired.

As shown by FIG. 9, the compositor 305 comprises an input buffer 342 that receives and buffers graphical data from each of the frame buffers 65–69. Note that, in the preferred embodiment, the frame buffer 65 comprises pixel color values defining 2D objects, such as the 2D graphical window 252 depicted by FIG. 6, for example, and the frame buffers 66–69 comprise pixel color values defining 3D objects.

For each image frame displayed by the display device 83, the compositor control logic 325 outputs a color value for each pixel of the image frame. The color values output by the compositor control logic 325 are transmitted to an output buffer 346, which buffers the pixel color values and provides these pixel color values to the display device 83. The display device 83 then displays an image frame based on these pixel color values via well-known techniques. The pixel color values output by the compositor control logic 325 and utilized by the display device 83 are preferably based on selected ones of the color values received from the frame buffers 65–69.

In this regard, for each pixel, the compositor control logic 325 analyzes the pixel's corresponding bit in the bit mask 336. If the corresponding bit indicates that the pixel is not marked for rendering 3D data, the compositor control logic 325 passes the pixel's color value from the frame buffer 65 to the output buffer 346. This output color value is then utilized by the display device 83 to color the pixel. However, if the corresponding bit indicates that the pixel is marked for rendering 3D data, then the compositor control logic 325 passes a color value that is based on one or more color values from one or more of the frame buffers 66–69, depending on the mode of operation of the system 300.

For example, if the corresponding bit indicates that the pixel is marked for rendering 3D data and if the system 300 is operating in a jitter enhancement mode, as described above, then the compositor control logic 325 receives from the input buffer 342 the pixel's color value from each of the frame buffers 66–69. The compositor control logic 325 then blends these received color values into a single color value and outputs this single color value to the output buffer 346.

However, if the corresponding bit indicates that the pixel is marked for rendering 3D data and if the system 300 is operating in an optimization mode, as described above, then the compositor control logic 325 selects one of the frame buffers 66–69 (i.e., the frame buffer 66–69 that stores data from the pipeline 56–59 that is responsible for rendering the pixel) and passes the pixel's color value from this selected frame buffer 66–69 to the output buffer 346. This output color value is then utilized by the display device 83 to color the pixel. In other modes of operation, the compositor control logic 325 may be configured to derive the pixel's color value from the values of the frame buffers 66–69 via other methodologies.

Figure 10:
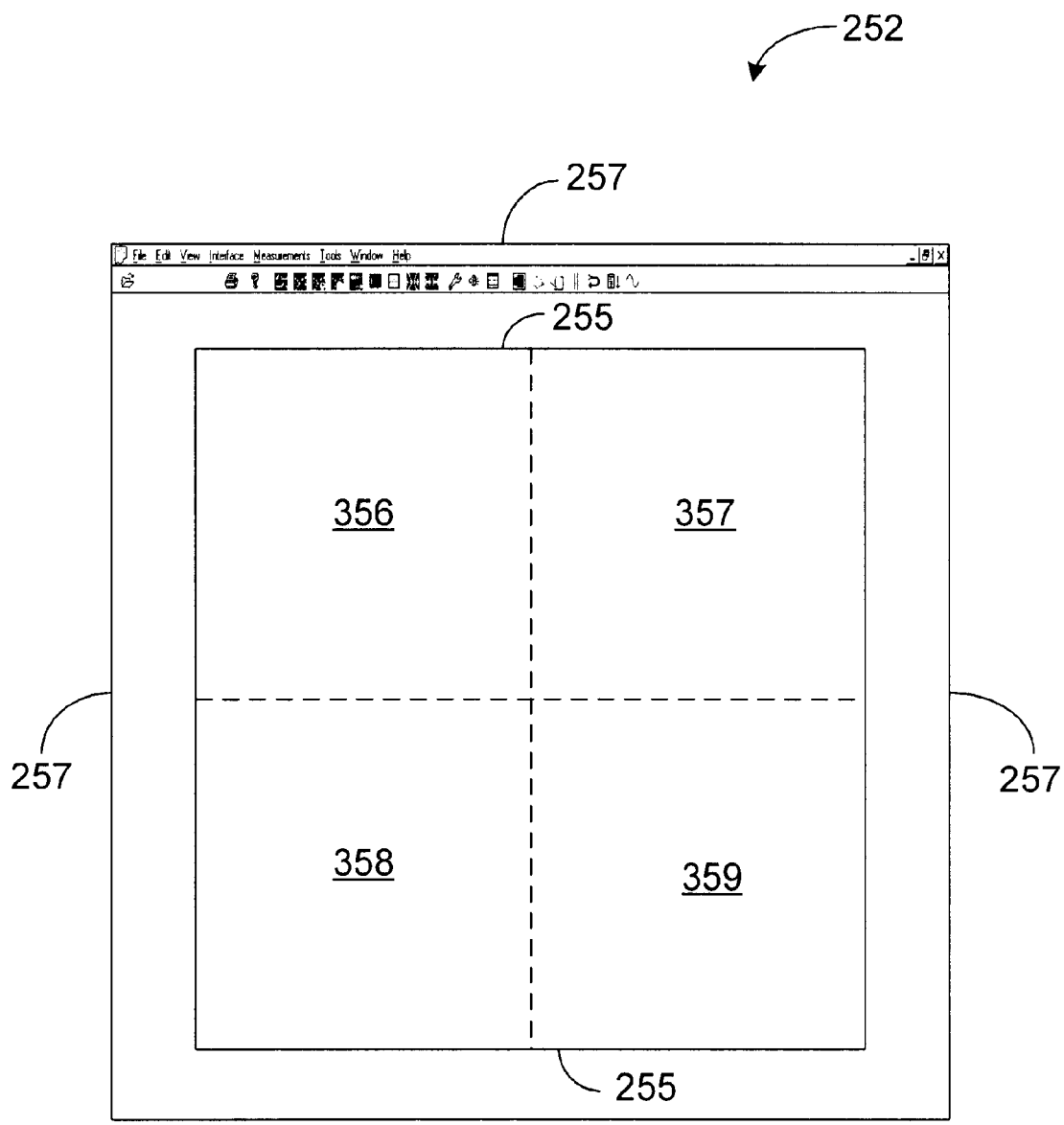
FIG. 10 is a diagram illustrating the exemplary two-dimensional window of FIG. 6, as displayed by the graphical display system of FIG. 7 when the graphical display system is operating in an optimization mode.

To better illustrate the preferred embodiment of the system 300, assume that the command analysis logic 303 receives a 2D graphics command for creating the 2D X window 252 depicted in FIG. 6 and then receives a 3D graphics command for displaying a 3D object within the region 255. Referring to FIG. 10, further assume that the system 300 is operating in the optimization mode and that pipelines 56–59 are responsible for rendering 3D objects within sub-regions 356–359, respectively.

Figure 11:
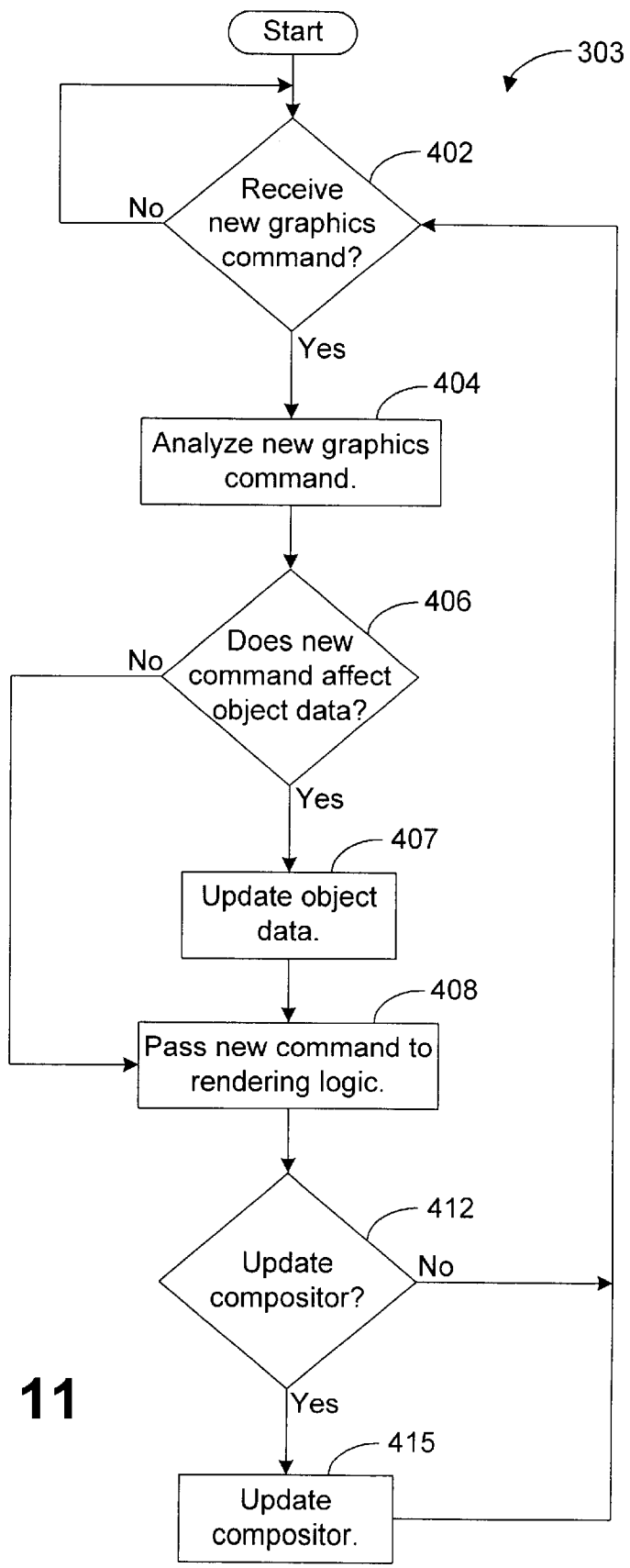
FIG. 11 is a flow chart illustrating an architecture and functionality of the command analysis logic depicted in FIG. 7.

Upon receiving the 2D graphics command, the command analysis logic 303 analyzes the 2D graphics command, as shown by blocks 402 and 404 of FIG. 11. The command analysis logic 303 then determines, in block 406, whether the 2D graphics command affects (e.g., changes) the object data 309. If so, the command analysis logic 303 updates the object data 309 in block 407. In the present example, the command analysis logic 303 determines that the 2D graphics command creates a 2D window 252 having a region 255 for displaying 3D objects. The command analysis logic 303 then updates the object data 309 to indicate that the pixels of region 255 may be used to display objects defined by 3D graphics commands.

After receiving the 2D graphics command, the command analysis logic 303 also passes the 2D graphics command to the X server 162 (FIG. 4) of the master pipeline 55, as shown by block 408. The X server 162 then renders the 2D graphics command. In rendering the 2D graphics command, the X server 162 updates the frame buffer 65 such that the data within the frame buffer 65 defines the window 252 depicted in FIG. 6.

Then, in block 412, the command analysis logic 303 determines whether the 2D graphics command changes which pixels are identified by the data 309 as being in a region of 3D rendering. If so, the command analysis logic 303, in block 415, informs the compositor 305 of the change. In the present example, assume that one or more of the pixels within the region 255 were not indicated as being utilized for rendering 3D data prior to the logic 303 receiving the 2D graphics command. In this situation, the logic 303 determines that the compositor 305 should be informed of the update in block 412, and so then informs the compositor 305, in block 415, that each of the pixels within region 255 may be utilized for displaying objects defined by 3D graphics command.

Upon receiving the 3D graphics command, the command analysis logic 303 analyzes the 3D graphics command in block 404. The command analysis logic 303 then determines, in block 406, whether the 3D graphics command affects the object data 309. If so, the command analysis logic 303 updates the object data 309 in block 407.

After receiving the 3D graphics command, the command analysis logic 303 also passes the 3D graphics command to the X server 162 (FIG. 4) of the master pipeline 55 in block 408. The X server 162 then processes the 3D graphics command according to techniques that will be described in more detail below.

Then, in block 412, the command analysis logic 303 determines if the 3D graphics command changes which pixels are identified by the data 309 as being in a region of 3D rendering. In the present example, the 3D graphics command merely defines an object that is to be displayed within the region 255. Therefore, the 3D graphics command does not cause such a change. As a result, the command analysis logic 303 may skip block 415 when processing the 3D graphics command.

As described above, the command analysis logic 303, in block 408, passes the 3D graphics command to the X server 162 of the master pipeline 55. The X server 162 then passes, to each of the slave pipelines 56–59, the 3D graphics command, which defines a 3D object to be displayed within the region 255 (FIG. 6). Each slave pipeline 56–59 then renders to its respective frame buffer 66–69 the portion of the 3D object that resides within its respective sub-region 356–359 of responsibility. For example, assume that slave pipeline 56 is responsible for rendering within sub-region 356. In this example, slave pipeline 56 renders, to the frame buffer 66, the portion of the 3D object that is to be displayed within the sub-region 356 and preferably refrains from rendering the other portions of the 3D object. Moreover, after each of the pipelines 56–59 renders the graphical data of the 3D graphics command, the frame buffers 56–59 preferably define the portions of the 3D object residing within sub-regions 356–359, respectively.

As described above, in processing the 2D graphics command, the command analysis logic 303, in block 415, transmits to the compositor 305 an update indicating that the pixels within the region 255 are to be utilized for rendering objects defined by 3D graphics commands. In response, the compositor control logic 325 ensures that the corresponding bits within the bit mask 336 are asserted.

Figure 12:
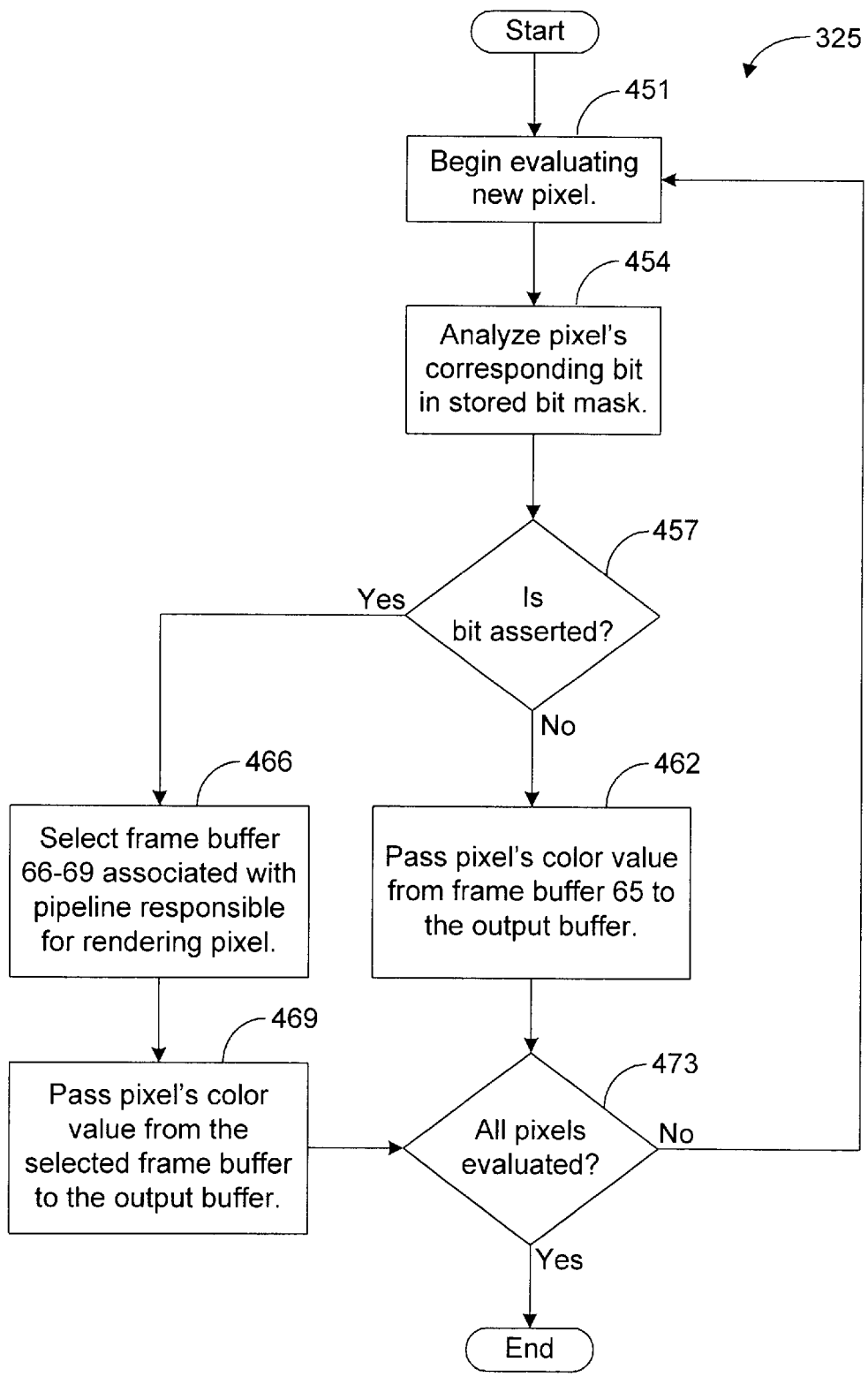
FIG. 12 is a flow chart illustrating an exemplary architecture and functionality of compositor control logic depicted in FIG. 9 in providing a composite data signal for an image frame when the graphical display system of FIG. 7 is operating in an optimization mode.

In order to provide the display device 83 with the appropriate color values for displaying the next image frame, the compositor control logic 325 begins to evaluate each pixel for the purpose of determining each pixel's color value. For each pixel, the compositor control logic 325 analyzes the pixel's corresponding bit in the bit mask 336, as shown by blocks 451 and 454 of FIG. 12. The compositor control logic 325 then determines whether or not the bit is asserted in block 457. In the present example, the bits corresponding to the pixels of the window 252 and outside of region 255 are deasserted, and the bits corresponding to the pixels within the region 255 are asserted. Thus, when the compositor control logic 325 evaluates a pixel within the window 252 and outside of region 255 (e.g., a pixel defining the border 257 of the window 252), the compositor control logic 325 proceeds to block 462. In this regard, the compositor control logic 325 passes the pixel's color value, as defined by the data within the frame buffer 65, to the display device 83, which colors the pixel based on this color value.

However, when the compositor control logic 325 evaluates a pixel within the region 255, the compositor control logic 325 proceeds to block 466 and selects one of the frame buffers 66–69. In this regard, the compositor control logic 325 selects the frame buffer 66–69 associated with the slave pipeline 56–69 that is responsible for rendering to the sub-region 356–359 where the pixel is located. For example, assume that pipeline 56 is responsible for rendering to the sub-region 356 and that the pixel being evaluated is located within the sub-region 356. In such a situation, the compositor control logic 325, in block 466, selects the frame buffer 66. Then, in block 469, the compositor control logic 325 passes the pixel's color value, as defined by the data within the selected frame buffer 66, to the display device 83, which colors the pixel based on this color value. As shown by block 473, once all of the pixels have been evaluated, the process of providing the display device 83 with color values for the current image frame is complete.

By performing the techniques described above, the window 252 is displayed via the display device 83. The portions of the window 252 outside of the region 255 are defined by data from the frame buffer 65, and the portions of the window 252 inside of the region 255 are defined by color values from one of the frame buffers 66–69. Note that, for other modes of operation, the processes shown by FIGS. 11 and 12 can remain the same except that blocks 466 and/or 469 may be altered in order to achieve the desired functionality of the selected mode of operation.

Now, therefore, the following is claimed:

1. A system, comprising:
   a plurality of frame buffers;
   a plurality of graphics pipelines, each of the graphics pipelines configured to render graphical data to a different one of the frame buffers;
   logic configured to analyze graphical data defining a two-dimensional (2D) graphical object and to identify, based on the analyzed graphical data, a region within the 2D graphical object for rendering three-dimensional (3D) graphical data, the logic configured to transmit a control signal having information indicative of the identified region; and
   a compositor configured to receive the control signal and to select one of the frame buffers based on the information in the control signal, the compositor further configured to provide a display device with a color value for a pixel within the identified region based on a pixel value received from the selected frame buffer.

2. The system of claim 1, wherein one of the pipelines comprises an X server, and wherein the logic is configured to receive the graphical data defining the 2D graphical object from a graphics application and to pass the graphical data defining the 2D graphical object to the X server.

3. The system of claim 1, wherein the control signal comprises a coordinate value identifying a pixel on a border of the identified region.

4. The system of claim 1, wherein the control signal comprises a bit mask having bits corresponding to pixels for displaying the 2D object and the identified region, the logic configured to mark each of the bits corresponding to pixels for displaying the identified region.

5. The system of claim 1, wherein the compositor is configured to maintain a bit mask, the bit mask including a bit for each pixel of the image, the compositor configured to mark, in response to the information within the control signal, each bit of the bit mask corresponding to a pixel of the identified region.

6. A system, comprising:
a plurality of frame buffers;
a plurality of graphics pipelines configured to receive graphics commands and to render graphical data to each of the plurality of frame buffers based on the received graphics commands;
a compositor configured to receive a control signal and to interface the graphical data with a display device based on the control signal; and
logic configured to analyze the graphics commands and to make a determination, based on the graphics commands, as to which pixels defined by the graphical data are associated with three-dimensional (3D) regions, the logic further configured to transmit the control signal to the compositor, wherein the control signal is based on the determination.

7. The system of claim 6, further comprising a display device.

8. The system of claim 6, wherein the compositor, for each pixel of the display device, is configured to select one of the frame buffers based on the control signal and to derive a pixel color value based on graphical data in the selected frame buffer.

9. The system of claim 6, wherein each of the pipelines comprises an X server.

10. The system of claim 6, wherein one of the pipelines is configured to receive each of the graphics commands, the one pipeline configured to pass each of the graphics commands having three-dimensional data to the other pipelines and to execute each of the other graphics commands.

11. The system of claim 6, wherein the control signal comprises a coordinate value identifying a pixel on a border of one of the 3D regions.

12. The system of claim 6, wherein the control signal defines a bit mask having bits corresponding to pixels defined by the graphical data, the logic configured to mark each of the bits corresponding to pixels associated with the 3D regions.

13. The system of claim 6, wherein the compositor is configured to maintain a bit mask, the bit mask comprising a bit for each pixel defined by the graphical data, the compositor configured to mark, based on the control signal, each bit of the bit mask corresponding to a pixel that is associated with one of the 3D regions.

14. A method, comprising the steps of:
rendering graphical data, in parallel, to a plurality of frame buffers;
identifying, within a two-dimensional (2D) object defined by the graphical data, a region for rendering three-dimensional (3D) graphical data;
indicating, via a control signal, the identified region;
selecting one of the frame buffers based on the control signal;
defining a color value for a pixel within the identified region based on graphical data from the selected frame buffer;
forming a composite data signal based on graphical data in each of the frame buffers, the composite data signal including the color value; and
displaying a graphical image based on the composite data signal.

15. The method of claim 14, further comprising the steps of:
defining another color value for a pixel within the 2D object and outside of the identified region based on graphical data from another of the frame buffers; and
displaying the 2D object based on said another color value.

16. The method of claim 14, wherein the identifying step comprises the step of:
forming a set of data indicative of a border of the identified region, the set of data including a coordinate of a pixel on the border of the identified region.

17. The method of claim 14, further comprising the steps of:
maintaining a bit mask, the bit mask including a bit for each pixel of the image; and
marking, in response to the identifying step, each of the bits corresponding to a pixel within the identified region.

18. A method, comprising the steps of:
rendering graphical data, in parallel, to a plurality of frame buffers, the graphical data defining a plurality of pixels;
transmitting the rendered graphical data via a plurality of video data streams;
determining which of the pixels are associated with three-dimensional (3D) regions;
transmitting, in parallel with the video data streams, a signal having information indicative of the pixels determined to be associated with 3D regions; and
forming, based on the information, a composite data signal that is derived from the rendered graphical data.

19. The method of claim 18, further comprising the step of displaying a graphical image based on the composite data signal.

20. The method of claim 18, further comprising the steps of:
selecting, for each of the pixels, one of the frame buffers based on the information; and
defining, for each of the pixels, a color value based on graphical data from the pixel's selected frame buffer,
wherein the composite data signal comprises each color value defined in the defining step.

21. The method of claim 18, further comprising the step of:
forming, in response to the determining step, a set of data indicative of a border of one of the 3D regions, the data the set of data comprising a coordinate of a pixel on the border of the one region,
wherein the selecting step is based on the set of data.

22. The method of claim 18, further comprising the steps of:
maintaining a bit mask, the bit mask comprising a bit for each pixel of the image; and
marking each of the bits corresponding to a pixel that is associated with one of the 3D regions.

* * * * *